United States Patent Office 3,606,354
Patented Sept. 20, 1971

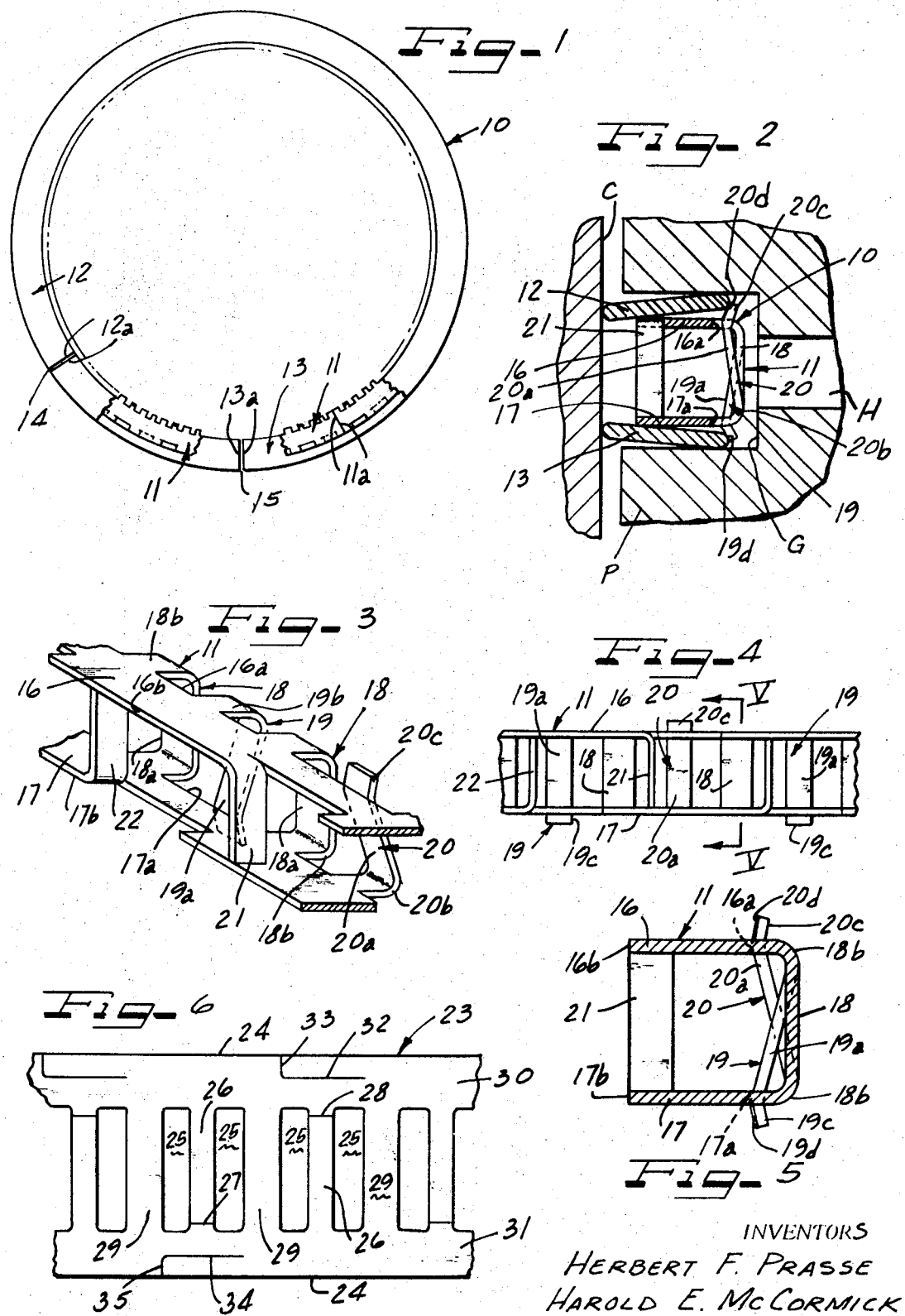

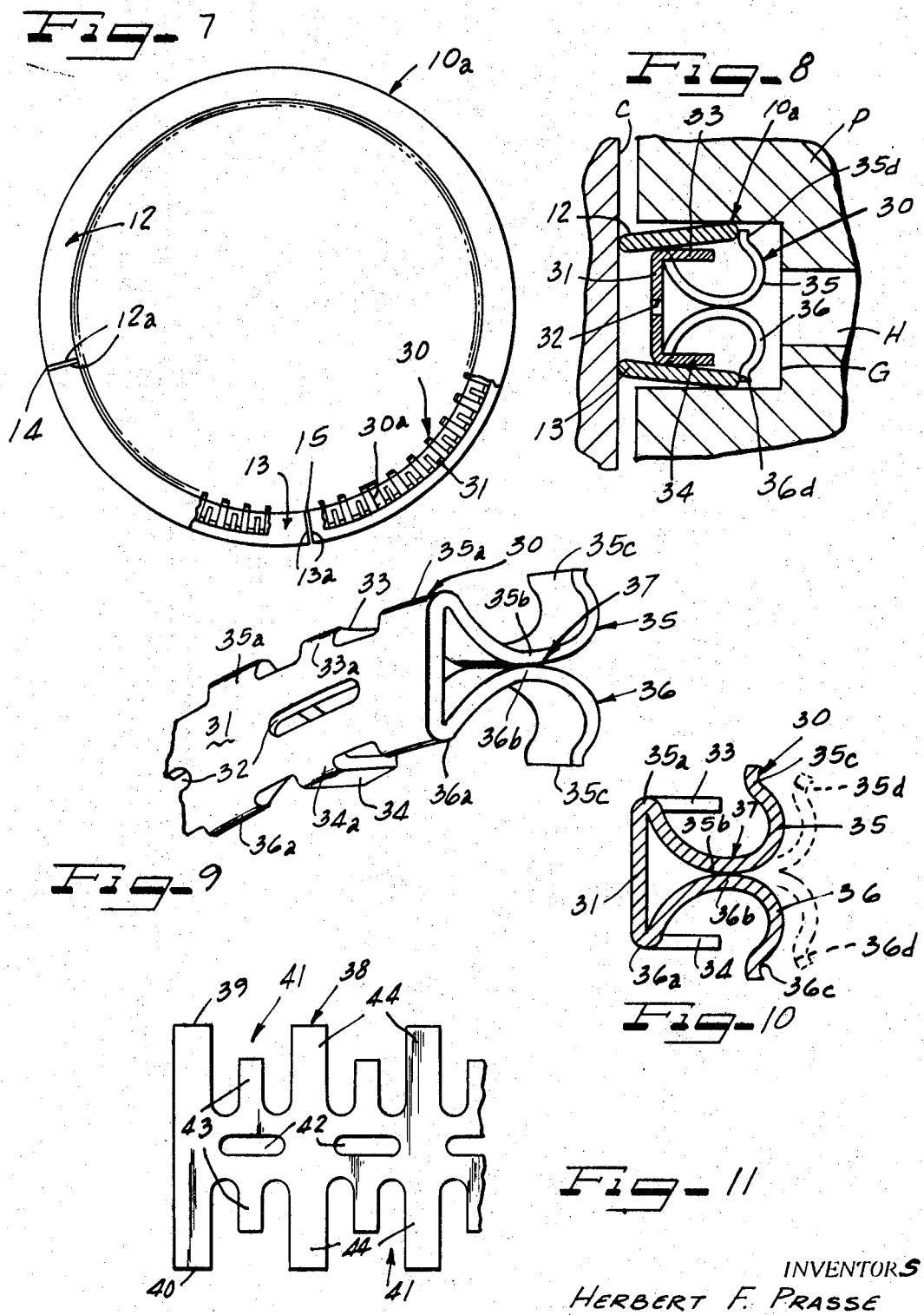

3,606,354
PISTON RING
Herbert F. Prasse, Town and Country, and Harold E. McCormick, Ballwin, Mo., assignors to Ramsey Corporation, St. Louis, Mo.
Filed Feb. 26, 1969, Ser. No. 802,351
Int. Cl. F16j 9/06, 15/56
U.S. Cl. 277—140    5 Claims

ABSTRACT OF THE DISCLOSURE

A spacer-expander ring for piston oil ring assemblies which can be economically and easily manufactured in continuous strip form, rolled and cut into split rings of desired size and heat treated to snap into a closed continuous ring with a diameter less than the diameter of the piston for which it is intended. The ring is circumferentially continuous, its ends will not overlap and it has individual spring fingers at its innermost periphery to engage the inner peripheries of thin split rail rings supported thereon.

FIELD OF THE INVENTION

This invention relates to the packing or piston ring art and more particularly to spacer-expander rings for oil control piston ring assemblies.

DESCRIPTION OF THE PRIOR ART

Spacer-expander rings for oil control piston ring assemblies are usually of the circumferential expansion or garter spring-type such as shown for example in the Marien United States Letters Patent Nos. 2,744,803 and 2,830,861. These rings can be made from strip stock but much of the stock must be cut-away and the remaining portion crimped, corrugated or otherwise longitudinally foreshortened to provide a circumferentially expansible ring. This type of ring must be contracted into the ring groove of the piston in order that it may exert a radial expanding force on the rail rings supported thereby. Such contraction tends to overlap the split ends of the ring requiring end abutment tabs and the like to stop the overlapping. Further, since the rings are circumferentially segmented they do not have the strength of a continuous ring.

SUMMARY OF THE INVENTION

The present invention now provides a circumferentially continuous spacer-expander ring made from a minimum amount of strip stock and having individual spring fingers circumferentially spaced around its inner periphery and extending axially beyond the rail ring supporting surfaces thereof to engage the inner peripheries of the rail rings for exerting an expanding force thereon. The ring is manufactured from continuous metal strip stock, rolled and cut into split rings of desired size and tempered to snap into a closed continuous ring with the ends abutting and having a diameter less than the diameter of the piston for which it is intended. Since the ring is not circumferentially contracted in use there is no tendency for its ends to overlap and special shaped end abutments heretofore required are not necessary. Thus the strip stock from which the rings are formed may be segmented into lengths for forming the desired diameter rings without loss of material between segments.

The individual spring fingers at the inner periphery of the rings of this invention are inwardly of the circumferentially continuous ring portions which support the rails and these rails do not have to be decreased in radial depth such as is necessary when the fingers are outwardly from the inner periphery of the supporting ring. The fingers have angled tab ends to dish the rails into side sealing engagement with the ring groove. Firmer support for the rail rings is provided since they are engaged by the fingers at their inner peripheries and rest on continuous ring areas near their outer peripheries.

The spacer-expander rings of this invention will not accept the rail rings except on the proper supporting surfaces thereof since no open channels are provided between the supporting surfaces.

The spacer-expander rings of this invention may take many different shapes and forms all of which however include a circumferentially continuous split ring with abutted together ends and individual spring fingers circumferentially spaced around the inner periphery of the ring and extending axially beyond the rail ring supporting surfaces thereof so as to engage the inner peripheries of the rail rings.

It is then an object of this invention to provide spacer-expander rings for oil control piston ring assemblies which have a circumferentially continuous ring portion and individual spring fingers spaced circumferentially around the inner periphery of the rings for engaging the inner peripheries of rail rings supported thereon.

Another object of this invention is to provide an abutment type split spacer-expander ring which will not overlap in a ring groove and which will radially expand rail rings supported thereon without being circumferentially contracted.

Another object of this invention is to provide a spacer-expander oil control ring for pistons which is manufactured from continuous metal strip stock without longitudinally foreshortening the stock.

Another object of the invention is to provide a circumferentially continuous spacer-expander ring with abutted together ends and rail ring expanding fingers at the inner periphery of the ring.

Another object of the invention is to provide a spacer-expander ring for rail ring type oil control piston ring assemblies which has individual spring fingers around the inner periphery thereof acting on the inner peripheries of the rail rings causing them to dish into side sealing engagement with the sides of a piston ring groove as they are urged radially outward.

Other and further objects of this invention will become apparent to those skilled in this art from the following detailed description of the annexed sheets of drawings which, by way of preferred examples only, illustrate two embodiments of the invention.

BRIEF DESCRIPTION OF THE DRAWINGS

FIG. 1 is a plan view of an oil control ring assembly in accordance with this invention with parts broken away to illustrate underlying parts;

FIG. 2 is a fragmentary vertical cross-sectional view of a piston and cylinder illustrating the oil ring groove in the piston equipped with the ring assembly of FIG. 1;

FIG. 3 is a fragmental isometric illustration of one form of spacer-expander ring of this invention;

FIG. 4 is a front-end elevational view of the ring of FIG. 3;

FIG. 5 is a transverse cross-sectional view of the ring taken along the line V—V of FIG. 4;

FIG. 6 is a fragmentary plan view of a blank of metal strip stock from which the ring of FIGS. 3 to 5 is formed;

FIG. 7 is a plan view similar to FIG. 1 but illustrating a modified spacer-expander ring according to this invention;

FIG. 8 is a view similar to FIG. 2 but illustrating the ring groove equipped with the assembly of FIG. 7;

FIG. 9 is a fragmentary isometric view of the spacer-expander ring of the assembly of FIGS. 7 and 8;

FIG. 10 is a transverse cross-sectional view of the spacer-expander ring of FIG. 9; and FIG. 11 is a fragmentary plan view of a blank of strip stock from which the spacer-expander ring of FIGS. 7 to 10 is formed.

DESCRIPTION OF THE PREFERRED EMBODIMENTS

FIGS. 1 and 2 illustrate a complete oil control ring assembly 10 including a spacer-expander ring 11 of this invention supporting and expanding a pair of thin split expandable metal rail rings 12 and 13. The top rail ring 12 has its ends 12a slightly spaced apart so that a clearance gap 14 is provided therebetween. Likewise, the bottom ring 13 has its ends 13a spaced apart providing a clearance gap 15 therebetween. The ends 11a of the spacer-expander ring 11 however are butted together and no gap exists therebetween so that the ring in its operating position is a continuous circle.

The assembly 10 as shown in FIG. 2 is carried in the oil ring groove G of a piston P which is mounted in an engine cylinder C. The groove G has holes H in the bottom thereof communicating with the interior of the piston for free flow of oil in the groove G.

As shown in FIG. 2 the rail rings 12 and 13 are supported in axially spaced relation on the spacer-expander ring 11 and have their inner peripheries engaged by the ring at an angle which dishes the rails into side sealing engagement with the side walls of the ring groove and urges the rings radially outward into sealing engagement with the cylinder C. The assembly 10 is thus known as a rail ring type side sealing oil control ring which allows free circulation of oil in the ring groove between the rails but seals the oil against leakage between the piston and cylinder beyond the rail rings.

The spacer-expander 11, as best shown in FIG. 3, includes circumferentially continuous top and bottom ring portions 16 and 17 connected in axially spaced parallel relation by circumferentially spaced axially upstanding integral legs 18 around the inner periphery of the ring with each leg 18 having a straight axially upstanding portion 18a with curved ends 18b extending radially outward to the inner peripheries 16a and 17a respectively of the ring portions 16 and 17. These ring portions 16 and 17 have outer peripheral edges 16b and 17b respectively which are radially outward from the inner peripheries a considerable distance. Flat top and bottom faces of appreciable radial depth are thus provided by the rings 16 and 17.

The legs 18 alternate with spring fingers 19 and 20 respectively depending from the top ring 16 and the bottom ring 17.

Each finger 19, as shown in FIGS. 3 to 5, has a main portion 19a depending from a rounded top end 19b which extends radially inward from the inner edge 16a of the top ring 16 to the same extent as the rounded ends 18b of the legs 18 and then the portion 19a slopes axially downward and radially outward as shown in FIG. 5 into close spaced relation with the inner edge 17a of the bottom ring 17. The fingers 19 have end tabs 19c projecting beneath the ring 17 and bent backwardly to provide an abutment front face 19d at an angle, preferably 7° to 12° from the vertical.

The fingers 20 are shaped and formed in the same manner as the fingers 19 with upwardly and outwardly extending main portions 20a depending from rounded ends 20b which extend radially inward from the ring 17 to the same depth as the fingers 18 and with the portions 20a extending outwardly close to the rear edge 16a of the top ring 16. An abutment tab 20c on each finger 20 then extends beyond the top ring 16 and is angled backwardly at the same angle as the tab 19c to provide the abutment face 20d.

Struts 21 and 22 depend alternately from the top and bottom rings 16 and 17 at the outer peripheral edges of these rings with the struts 21 depending from the top ring 16 being bottomed on the bottom ring 17 and with the struts 22 depending from the bottom ring 17 being bottomed on the top ring 16. The struts 21 and 22 are equally spaced around the periphery of the ring and prevent the rail rings from entering the channel between the rings 16 and 17.

As shown in FIG. 2, the rail rings 12 and 13 have their inner edges engaged by the angled abutment faces 20d and 19d respectively of the spring fingers 20 and 19 and these fingers are bent back from their free state condition of FIG. 5 so as to exert radially outward and axially outward expanding forces on the rings 11 and 12 urging their outer peripheries into good sealing condition with the cylinder C.

The rail rings 12 and 13 are supported on the ring portions 16 and 17 of the spacer-expander 11 near the outer peripheral ends of these rings and the rail rings are free to rock on the surfaces provided by these rings 16 and 17.

It should be understood that in the free state condition of the ring 11 the ends 11a thereof are abutted. The ring is easily slipped over the piston to snap into the groove G and when its ends are abutted together in the groove the inner periphery of the ring is of larger diameter than the ring groove so that the back wall of the ring groove is spaced from the inner periphery of the assembly as shown in FIG. 2. The ring 11 is not circumferentially compressed in the ring groove and therefore its ends 11a have no tendency to overlap. No special end abutment tabs need be provided as in the case of garter spring type rings.

The spring fingers 19 and 20 act independently on the rail rings 12 and 13 to provide their spring force action from bases which are solid continuous rings 16 and 17. In the operative position, the abument faces 19d and 20d of the spring fingers are at the inner periphery of the spacer-expander 11 and the rail rings 12 and 13 can have the same radial depths as when used in garter spring type assemblies.

As shown in FIG. 6, the ring 11 is made from a blank 23 that is punched out from a continuous metal strip. The blank 23 has parallel side edges 24 and is transversely punched to provide adjacent pairs of cut-out portions 25 separated by a strip 26. Alternate strips 26 have opposite ends 27 and 28 severed from the blank to provide free ends for the strips.

The pairs of cut-outs 25 are separated from each other by strips 29 wider than the strips 26. Continuous margin portions 30 and 31 extend inwardly from the edges 23 and 24 to the ends of the punched out sections 25. Each marginal portion 30 and 31 is lanced at intervals, preferably alternately overlying the pairs of punched out portions 25. Thus, the marginal portion 30 has a longitudinal cut 32 parallel with the edge 23 terminating in a transverse cut 33 extending to the end edge 23. The cut 32 is about the same length as the distance between the strip portions 29.

The marginal portion 31 is similarly cut with a longitudinal cut 34 terminating in a transverse cut 35.

The blank 23 is bent into a U-shape with the marginal portions 30 and 31 forming the top and bottom rings 16 and 17 of the finished ring 11, with the portions 29 forming the legs 18 of the ring, with the portions 26 forming the spring fingers 19 and 20 and with the cut-out portions provided by the cuts 32–35 forming the struts 21 and 22. The ring 11 can be formed in a continuous strip form, cut into segments for forming the rings of desired diameter, coiled into ring shape with the ends abutting, and heat treated so that the coil rings will have their ends abutted together in the free state. The material forming the ring can be a steel such as SAE 1075 and a coining operation can be used to accurately shape the abutment faces 19d and 20d of the fingers.

For 1075 material the heat treatment may consist of heating the finished rings to 1500° F. and quenching in oil. This is followed by a tempering operation in which the rings may be heated to 600° F. for one (1) hour to secure the desired spring properties and a hardness in the range of 45–55 Rockwell "C."

It will be understood, however, that other materials than 1075 steel can be used in which the heat treatment may be altered to acquire the desired spring properties.

In the modification of FIGS. 7 to 10 parts identical with parts described in FIGS. 1 to 5 are marked with the same reference numerals.

As shown in FIGS. 7 and 8 the oil control ring assembly 10a has the same rail rings 12 and 13 as the assembly 10. However, the spacer-expander 30, best shown in FIGS. 9 and 10, has a circumferentially continuous upstanding outer peripheral wall 31 with circumferentially spaced elongated slots 32 at intervals thereon intermediate the top and bottom ends thereof and with axially aligned and spaced radially inwardly extending legs 33 and 34 alternating with axial aligned abutted together fingers 35 and 36.

The legs 33 and 34 extend in flat radial planes from the top and bottom edges of the circumferential front wall 31 and are connected thereto by rounded outer end portions 33a and 34a respectively.

The fingers 35 and 36 are cylindrically curved and extend from rounded front ends 35a and 36a respectively at the top and bottom edges of the front wall 31. The top fingers 35 curve downwardly to a central bottom portion 35b about midway between the top and bottom edges of the wall 31 while the bottom fingers 36 curve upwardly to apexes 36b abutting the portions 35b at areas 37. The fingers 35 then curve upwardly to free end portions 35c at levels above the top faces of the legs 33. The fingers 36 curve downwardly to free end edges 36c at levels below the bottom faces of the legs 34. For descriptive purposes, the curvature of the fingers 35 and 36 is herein described as being a wide U radial cross-sectional shape.

The free ends 35c and 36c of the fingers 35 and 36 provide spring abutments engaging the inner peripheries of the rails 12 and 13 to urge them radially and axially outward as shown in FIG. 8.

In operation the spacer-expander 30, as shown in FIG. 7, has the end edges thereof abutted at 30a to form a continuous ring. The curved free end portions 35c and 36c of the fingers 35 and 36, as shown in FIG. 10, are deflected rearwardly so that rail ring abutment faces 35d and 36d are provided in angled relation to the inner peripheries of the rail rings causing them to dish into side sealing engagement with the piston ring groove as shown in FIG. 8. The spring fingers 35 and 36 bend about the fulcrum point provided by the contacting surface 37 so that the fingers are quite stiff.

The legs 33 and 34 afford ample radial support for the rail rings and prevent them from dishing into the recesses afforded by the curved spring fingers.

The spacer-expander 30, like the spacer-expander 11, is easily formed from a continuous strip of metal stock which is punched to form the blank shown in FIG. 11. As therein shown, a metal strip 38 is punched transversely along both end edges 39 and 40 thereof to provide pairs of transversely aligned W-shape cut-outs 41. This strip is also punched to provide elongated cut-outs 42 along the axial center thereof between the cut-outs 41.

The cut-out portions 41 provide aligned short fingers 43 and long fingers 44 alternating with the fingers 43. The strip 38 is bent into U-shape with the short legs 43 forming the legs 33 and 34 of the finished ring and with the long legs 44 forming the spring fingers 35 and 36 of the finished ring.

Like the ring 11, the ring 30 can be formed from continuous strip stock, does not overlap in operation because it is heat treated to snap to a closed position with its end edges abutted together and is not circumferentially contracted in operation as in the case of garter spring expanders. The springs provided by the fingers act individually on the inner peripheries of the rail rings from a continuous circumferential base provided by the front wall 31 and by the abutted together surfaces 37.

From the above description it will be understood that the spacer-expanders of this invention do not contract circumferentially in operation, have at least one continuous circumferential portion, and have individual spring fingers projecting axially above and below this portion or portions radially inwardly therefrom to expand and dish rail rings resting on the portion or portions. The rings may take many different shapes and the herein specifically described embodiments only show two of such shapes.

Although various minor modifications might be suggested by those versed in the art, it should be understood that we wish to embody within the scope of the patent warranted hereon all such modifications as reasonably and properly come within the scope of our contribution to the art.

We claim as our invention:

1. A spacer-expander ring for oil control piston ring assemblies which comprises: a split metal ring having abutted together ends in operation and a continuous circumferential wall between said ends, said ring having top and bottom surfaces adapted to support rail rings mounted thereon, and circumferentially spaced individual spring fingers integral with and radially inward from said ring and projecting axially beyond said surfaces to engage the inner peripheries of rail rings supported on the surfaces, each of the said spring fingers having abutting portions contacting another spring finger.

2. A spacer-expander ring for oil control piston ring assemblies of the type having a pair of rail rings in axially spaced relation which comprises: a metal split ring with abutted together ends, said ring having at least one circumferentially continuous wall between said ends, said ring having radially extending faces for supporting rail rings thereon, and circumferentially spaced individual spring fingers integral with said ring and radially inward therefrom projecting beyond said faces to engage the inner peripheries of the rail rings at an angle for causing the rings to dish into side sealing engagement in a ring groove, each of said fingers forming a radially extending wide U shape.

3. A spacer-expander ring for rail ring type oil control piston rings which comprises: a split ring having an axially extending continuous outer peripheral wall, legs extending radially inward from the top and bottom ends of said wall at circumferentially spaced intervals, curved, radially extending substantially wide spread U shaped, spring fingers extending radially inward from the top and bottom ends of said wall between said legs, and said spring fingers having free inner ends projecting axially beyond said legs to provide abutment tabs for engaging the inner peripheries of rail rings supported on the legs.

4. The spacer-expander ring of claim 1 wherein the fingers are curved radially and axially inward from said wall in axially superimposed abutted together pairs.

5. In a spacer-expander ring for rail type oil control piston rings, the improvement of an outer periphery axially upstanding circumferential wall with integral spring fingers extending radially inward from the top and bottom portions of the wall in aligned relation and terminating in upstanding abutment tabs radially inward and axially outward from the wall to engage the inner peripheries of rail rings supported on the wall, and each of said spring fingers having axially curved portions in abutting contact with the curved portion of the aligned adjacent finger to provide a fulcrum point for the spring fingers.

References Cited

UNITED STATES PATENTS

| | | | |
|---|---|---|---|
| 2,811,399 | 10/1957 | Mayfield | 277—200 |
| 3,190,662 | 6/1965 | Mayfield | 277—140 |
| 3,460,846 | 8/1969 | Schmidt et al. | 277—140 |
| 3,477,732 | 11/1969 | Warrick | 277—140 |

SAMUEL B. ROTHBERG, Primary Examiner

U.S. Cl. X.R.

277—200